US010819623B2

(12) United States Patent
Hao

(10) Patent No.: US 10,819,623 B2
(45) Date of Patent: *Oct. 27, 2020

(54) METHOD AND DEVICE FOR TRANSMITTING DATA

(71) Applicant: Huawei Technologies Co., Ltd., Shenzhen (CN)

(72) Inventor: Zheng Hao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,596

(22) Filed: Apr. 23, 2019

(65) Prior Publication Data

US 2019/0253344 A1 Aug. 15, 2019

Related U.S. Application Data

(63) Continuation of application No. 15/068,281, filed on Mar. 11, 2016, now Pat. No. 10,298,487, which is a
(Continued)

(30) Foreign Application Priority Data

Sep. 13, 2013 (CN) .......................... 2013 1 0419790

(51) Int. Cl.
*G01R 31/08* (2020.01)
*H04L 12/703* (2013.01)
(Continued)

(52) U.S. Cl.
CPC ................ *H04L 45/28* (2013.01); *H04L 1/22* (2013.01); *H04L 45/22* (2013.01); *H04W 88/08* (2013.01);
(Continued)

(58) Field of Classification Search
USPC ....... 370/217, 401, 474, 216, 219, 221, 225, 370/228, 242, 254, 328, 352, 353, 389,
(Continued)

(56) References Cited

U.S. PATENT DOCUMENTS 7,342,890 B1 * 3/2008 Ferguson ................ H04L 12/66
370/238
10,298,487 B2 * 5/2019 Hao .......................... H04L 1/22
(Continued)

FOREIGN PATENT DOCUMENTS

| CN | 101227397 A | 7/2008 |
| CN | 102098201 A | 6/2011 |

(Continued)

OTHER PUBLICATIONS

Simpson, W., "The Point-to-Point Protocol (PPP)," Network Working Group, Request for Comments: 1661, STD: 51, Obsoletes: 1548, Category: Standards Track, Jul. 1994, 54 pages.

*Primary Examiner* — Phuongchau Ba Nguyen
(74) *Attorney, Agent, or Firm* — Slater Matsil, LLP

(57) ABSTRACT

A method includes generating an active route (AR) between a first network element (NE) and a second NE, the AR includes a first route between an active core device (ACD) and the first NE and a second route between the ACD and the second NE, transmitting data between the first NE and the second NE through the AR sending an identity and a state of a first gateway interface that is connected to the first NE and is included in the ACD to a standby core device (SCD), the SCD generates a standby route (SR) between the first NE and the second NE, the SR includes a third route between the SCD and the first NE and a fourth route between the SCD and the second NE; and when a fault occurs on the first route, transmitting the data between the first NE and the second NE through the SR.

19 Claims, 6 Drawing Sheets

Related U.S. Application Data continuation of application No. PCT/CN2014/084810, filed on Aug. 20, 2014.

(51) Int. Cl.
    *H04L 12/707*     (2013.01)
    *H04L 1/22*     (2006.01)
    *H04W 88/08*     (2009.01)
    *H04W 88/12*     (2009.01)
    *H04W 88/14*     (2009.01)
    *H04W 88/16*     (2009.01)

(52) U.S. Cl.
    CPC ............ *H04W 88/12* (2013.01); *H04W 88/14* (2013.01); *H04W 88/16* (2013.01)

(58) Field of Classification Search
    USPC .......................... 370/431, 432, 464, 465, 469
    See application file for complete search history.

(56) References Cited

U.S. PATENT DOCUMENTS

| | | | |
|---|---|---|---|
| 2009/0161535 A1 | 6/2009 | Saha | |
| 2014/0010073 A1* | 1/2014 | Shah | ...................... H04L 45/28 370/228 |
| 2015/0288600 A1 | 10/2015 | Xie et al. | |

FOREIGN PATENT DOCUMENTS

| | | |
|---|---|---|
| CN | 102201987 A | 9/2011 |
| CN | 102325037 A | 1/2012 |
| CN | 103052106 A | 4/2013 |
| CN | 103229536 A | 7/2013 |
| CN | 103634209 A | 3/2014 |
| EP | 2925051 A1 | 9/2015 |

\* cited by examiner

METHOD AND DEVICE FOR TRANSMITTING DATA

CROSS-REFERENCE TO RELATED APPLICATIONS

This application is a continuation of U.S. patent application Ser. No. 15/068,281, filed on Mar. 11, 2016, which is a continuation of International Application No. PCT/CN2014/084810, filed on Aug. 20, 2014. The International Application claims priority to Chinese Patent Application No. 201310419790.2, filed on Sep. 13, 2013. All of the aforementioned patent applications are hereby incorporated by reference in their entireties.

TECHNICAL FIELD

The present application relates to the field of communications, and in particular, to a method and a device for transmitting data.

BACKGROUND

A mobile bearer network is configured to carry communications data between a base station and a base station controller; the mobile bearer network includes a core device. When the base station sends data to the base station controller, the base station first sends the data to the core device, and then the core device sends the data to the base station controller; and when the base station controller sends data to the base station, the base station controller first sends the data to the core device, and then the core device sends the data to the base station.

Currently, the mobile bearer network includes two types of core devices, which are an active core device and a standby core device separately. When the base station begins to transmit data to the base station controller, the active core device activates a link between the active core device and the base station, and performs Multilink Point to Point Protocol (MLPPP) negotiation with the base station through the link. If the negotiation is successful, a state of a base station gateway interface in the active core device is set to a normal operating state, and a state of a base station controller gateway interface in the active core device is set to an active state; and a first route between the active core device and the base station is generated, and a second route between the active core device and the base station controller is generated. When the base station performs data communication with the base station controller, data can be transmitted through the first route and the second route. When a fault occurs on the link between the active core device and the base station, a link between the standby core device and the base station is activated, and the standby core device performs MLPPP negotiation with the base station through the link. If the negotiation is successful, a state of a base station gateway interface in the standby core device is set to a normal operating state, a third route between the standby core device and the base station is generated, and the third route is sent to the active core device, so that the data to be transmitted between the base station and the base station controller is transmitted through the third route and the second route.

Embodiments described herein provide for a system where, a negotiation time or an MLPPP negotiation between the standby core device and the base station is not long, and the first route does works during a process in which the standby core device performs MLPPP negotiation with the base station, so that a lot of data transmitted between the base station controller and the base station to is not lost.

SUMMARY

Embodiments of the present application provide a method and a device for transmitting data. The technical solutions are as follows.

According to a first aspect, a method for transmitting data is provided, where the method includes generating an active route between a first network element and a second network element, where the active route includes a first route between an active core device and the first network element and a second route between the active core device and the second network element, and transmitting data between the first network element and the second network element through the active route, sending an identity ID and a state of a first gateway interface that is connected to the first network element and is included in the active core device to a standby core device, so that the standby core device generates a standby route between the first network element and the second network element, where the standby route includes a third route between the standby core device and the first network element and a fourth route between the standby core device and the second network element, and when a fault occurs on the first route, transmitting the data between the first network element and the second network element through the standby route.

Optionally, the generating an active route between a first network element and a second network element includes activating a link between the active core device and the first network element, and performing Multilink Point to Point Protocol MLPPP negotiation with the first network element through the link, if the negotiation is successful, setting a state of the first gateway interface that is connected to the first network element and is included in the active core device to a normal operating state, and generating the first route between the active core device and the first network element, and forming the active route between the first network element and the second network element by using the first route and the second route that is between the active core device and the second network element.

Optionally, after the sending an identity ID and a state of a first gateway interface that is connected to the first network element and is included in the active core device to a standby core device, the method further includes receiving the third route, sent by the standby core device, between the standby core device and the first network element, forming the fourth route between the standby core device and the second network element by using a fifth route between the active core device and the standby core device and the second route between the active core device and the second network element, and forming the standby route between the first network element and the second network element by using the third route and the fourth route.

Optionally, the generating an active route between a first network element and a second network element includes activating a link between the active core device and the first network element, and performing MLPPP negotiation with the first network element through the link, if the negotiation is successful, setting a state of the first gateway interface that is connected to the first network element and is included in the active core device to a normal operating state, and generating the first route between the active core device and the first network element, and sending the first route to an access device, so that the access device forms the active route between the first network element and the second network element by using the first route and the second route that is between the active core device and the second network element.

Optionally, the method further includes if an alarm exists in the active core device, sending the ID and the state of the first gateway interface that is connected to the first network element and that is included in the active core device and alarm information of the active core device to the standby core device, so that the standby core device sets a state of a second gateway interface that is connected to the first network element and is included in the standby core to a non-operating state.

Optionally, the method further includes if a user manually sets the state of the first gateway interface that is connected to the first network element and is included in the active core device to a non-operating state, sending the ID and the state of the first gateway interface that is connected to the first network element and is included in the active core device to the standby core device, so that the standby core device sets a state of a second gateway interface that is connected to the first network element and is included in the standby core device to a non-operating state.

According to a second aspect, a method for transmitting data is provided, where the method includes receiving an identity ID and a state, which are sent by an active core device, of a first gateway interface, where the first gateway interface is connected to a first network element and is included in the active core device, generating a standby route between the first network element and a second network element according to the ID and the state of the first gateway interface that is connected to the first network element and is included in the active core device, and when a fault occurs on an active route between the first network element and the second network element, transmitting data between the first network element and the second network element through the standby route.

Optionally, the generating a standby route between the first network element and a second network element according to the ID and the state of the first gateway interface that is connected to the first network element and is included in the active core device includes setting a state of a second gateway interface that is connected to the first network element and is included in a standby core device to a normal operating state according to the ID and the state of the first gateway interface that is connected to the first network element and is included in the active core device, and generating a third route between the standby core device and the first network element, and sending the third route to the active core device, so that the active core device forms the standby route between the first network element and the second network element by using the third route and a fourth route that is between the standby core device and the second network element.

Optionally, the generating a standby route between the first network element and a second network element according to the ID and the state of the first gateway interface that is connected to the first network element and is included in the active core device includes setting a state of a second gateway interface that is connected to the first network element and is included in a standby core device to a normal operating state according to the ID and the state of the first gateway interface that is connected to the first network element and is included in the active core device, and generating a third route between the standby core device and the first network element, and sending the third route to an access device, so that the access device forms the standby route between the first network element and the second network element by using the third route and a fourth route that is between the standby core device and the second network element.

Optionally, the method further includes receiving the ID and the state of the first gateway interface and alarm information of the active core device that are sent by the active core device, where the first gateway interface is connected to the first network element and is included in the active core device, and setting the state of the second gateway interface that is connected to the first network element and is included in the standby core device to a non-operating state according to the ID and the state of the first gateway interface that is connected to the first network element and is included in the active core device.

Optionally, the method further includes if a user manually sets the state of the first gateway interface that is connected to the first network element and is included in the active core device to a non-operating state, receiving the ID and the state, which are sent by the active core device, of the first gateway interface, where the first gateway interface is connected to the first network element and is included in the active core device, and setting the state of the second gateway interface that is connected to the first network element and is included in the standby core device to a non-operating state according to the ID and the state of the first gateway interface that is connected to the first network element and is included in the active core device.

According to a third aspect, a device for transmitting data is provided, where the device includes a first generating module, configured to generate an active route between a first network element and a second network element, where the active route includes a first route between an active core device and the first network element and a second route between the active core device and the second network element, and transmit data between the first network element and the second network element through the active route, a first sending module, configured to send an identity ID and a state of a first gateway interface that is connected to the first network element and is included in the active core device to a standby core device, so that the standby core device generates a standby route between the first network element and the second network element, where the standby route includes a third route between the standby core device and the first network element and a fourth route between the standby core device and the second network element, and a first transmission module, configured to when a fault occurs on the first route, transmit the data between the first network element and the second network element through the standby route.

Optionally, the first generating module includes a first negotiation unit, configured to activate a link between the active core device and the first network element, and perform Multilink Point to Point Protocol MLPPP negotiation with the first network element through the link, a first generating unit, configured to if the negotiation is successful, set a state of the first gateway interface that is connected to the first network element and is included in the active core device to a normal operating state, and generate the first route between the active core device and the first network element, and a first forming unit, configured to form the active route between the first network element and the second network element by using the first route and the second route that is between the active core device and the second network element.

Optionally, the device further includes a first receiving module, configured to receive the third route, sent by the standby core device, between the standby core device and the first network element, a first forming module, configured to form the fourth route between the standby core device and the second network element by using a fifth route between the active core device and the standby core device and the second route between the active core device and the second network element, and a second forming module, configured to form the standby route between the first network element and the second network element by using the third route and the fourth route.

Optionally, the first generating module includes a second negotiation unit, configured to activate a link between the active core device and the first network element, and perform MLPPP negotiation with the first network element through the link, a second generating unit, configured to if the negotiation is successful, set a state of the first gateway interface that is connected to the first network element and is included in the active core device to a normal operating state, and generate the first route between the active core device and the first network element, and a second forming unit, configured to send the first route to an access device, so that the access device forms the active route between the first network element and the second network element by using the first route and the second route that is between the active core device and the second network element.

Optionally, the device further includes a second sending module, configured to if an alarm exists in the active core device, send the ID and the state of the first gateway interface that is connected to the first network element and that is included in the active core device and alarm information of the active core device to the standby core device, so that the standby core device sets a state of a second gateway interface that is connected to the first network element and is included in the standby core to a non-operating state.

Optionally, the device further includes a third sending module, configured to if a user manually sets the state of the first gateway interface that is connected to the first network element and is included in the active core device to a non-operating state, send the ID and state of the first gateway interface that is connected to the first network element and is included in the active core device to the standby core device, so that the standby core device sets a state of a second gateway interface that is connected to the first network element and is included in the standby core device to a non-operating state.

According to a fourth aspect, a device for transmitting data is provided, where the device includes a second receiving module, configured to receive an identity ID and a state, which are sent by an active core device, of a first gateway interface, where the first gateway interface is connected to a first network element and is included in the active core device, a second generating module, configured to generate a standby route between the first network element and a second network element according to the ID and the state of the first gateway interface that is connected to the first network element and is included in the active core device, and a second transmission module, configured to when a fault occurs on an active route between the first network element and the second network element, transmit data between the first network element and the second network element through the standby route.

Optionally, the second generating module includes a first setting unit, configured to set a state of a second gateway interface that is connected to the first network element and is included in a standby core device to a normal operating state according to the ID and the state of the first gateway interface that is connected to the first network element and is included in the active core device, and a first sending unit, configured to generate a third route between the standby core device and the first network element, and send the third route to the active core device, so that the active core device forms the standby route between the first network element and the second network element by using the third route and a fourth route that is between the standby core device and the second network element.

Optionally, the second generating module includes a second setting unit, configured to set a state of a second gateway interface that is connected to the first network element and is included in a standby core device to a normal operating state according to the ID and the state of the first gateway interface that is connected to the first network element and is included in the active core device, and a second sending unit, configured to generate a third route between the standby core device and the first network element, and send the third route to an access device, so that the access device forms the standby route between the first network element and the second network element by using the third route and a fourth route that is between the standby core device and the second network element.

Optionally, the device further includes a third receiving module, configured to receive the ID and the state of the first gateway interface and alarm information of the active core device that are sent by the active core device, where the first gateway interface is connected to the first network element and is included in the active core device, and a first setting module, configured to set the state of the second gateway interface that is connected to the first network element and is included in the standby core device to a non-operating state according to the ID and the state of the first gateway interface that is connected to the first network element and is included in the active core device.

Optionally, the device further includes a fourth receiving module, configured to if a user manually sets the state of the first gateway interface that is connected to the first network element and is included in the active core device to a non-operating state, receive the ID and the state, which are sent by the active core device, of the first gateway interface, where the first gateway interface is connected to the first network element and is included in the active core device, and a second setting module, configured to set the state of the second gateway interface that is connected to the first network element and is included in the standby core device to a non-operating state according to the ID and the state of the first gateway interface that is connected to the first network element and is included in the active core device.

According to a fifth aspect, a device for transmitting data is provided, where the device includes a first memory and a first processor, and is configured to execute the method for transmitting data.

According to a sixth aspect, a device for transmitting data is provided, where the device includes a second memory and a second processor, and is configured to execute the method for transmitting data.

In the embodiments of the present application, an active route and a standby route between a base station and a base station controller are stored in an active core device, and if a fault occurs on a first route between the active core device and the base station, a standby core device does not need to perform MLPPP negotiation with the base station, instead, it is only required that the active core device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station, loss of the data transmitted between the base station controller and the base station can be reduced.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present application clearer, the following further describes the embodiments of the present application in detail with reference to the accompanying drawings.

In the embodiments of the present application, each of a first core device and a second core device may be a router, when a base station sends data to a base station controller, the base station may send the data to the base station controller by using the first core device and/or the second core device, and when the base station controller sends data to the base station, the base station controller may also send the data to the base station by using the first core device and/or the second core device.

Embodiment 1

The embodiment of the present application provides a method for transmitting data.

Figure 1:
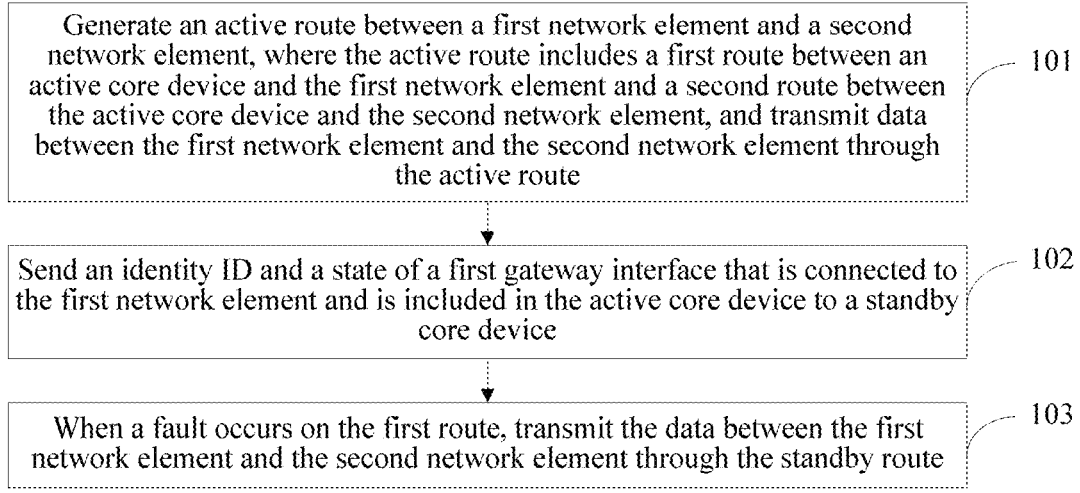
FIG. 1 is a flowchart of a method for transmitting data according to Embodiment 1 of the present application.

Referring to FIG. 1, the method includes

S101: Generate an active route between a first network element and a second network element, where the active route includes a first route between an active core device and the first network element and a second route between the active core device and the second network element, and transmit data between the first network element and the second network element through the active route.

S102: Send an identity ID and a state of a first gateway interface that is connected to the first network element and is included in the active core device to a standby core device, so that the standby core device generates a standby route between the first network element and the second network element, where the standby route includes a third route between the standby core device and the first network element and a fourth route between the standby core device and the second network element.

S103: When a fault occurs on the first route, transmit the data between the first network element and the second network element through the standby route.

The embodiment of the present application may be executed by an active core device.

In the embodiment of the present application, an active route and a standby route between a base station and a base station controller are stored in an active core device, and if a fault occurs on a first route between the active core device and the base station, a standby core device does not need to perform MLPPP negotiation with the base station, instead, it is only required that the active core device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station, loss of the data transmitted between the base station controller and the base station is reduced.

Embodiment 2

Figure 2:
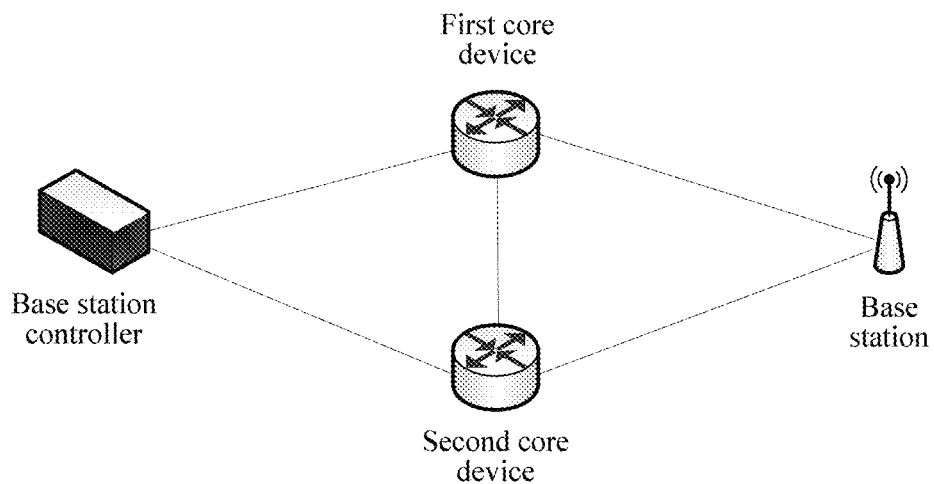
FIG. 2 is an architectural diagram of a system for transmitting data according to Embodiment 2 of the present application.
Figure 3:
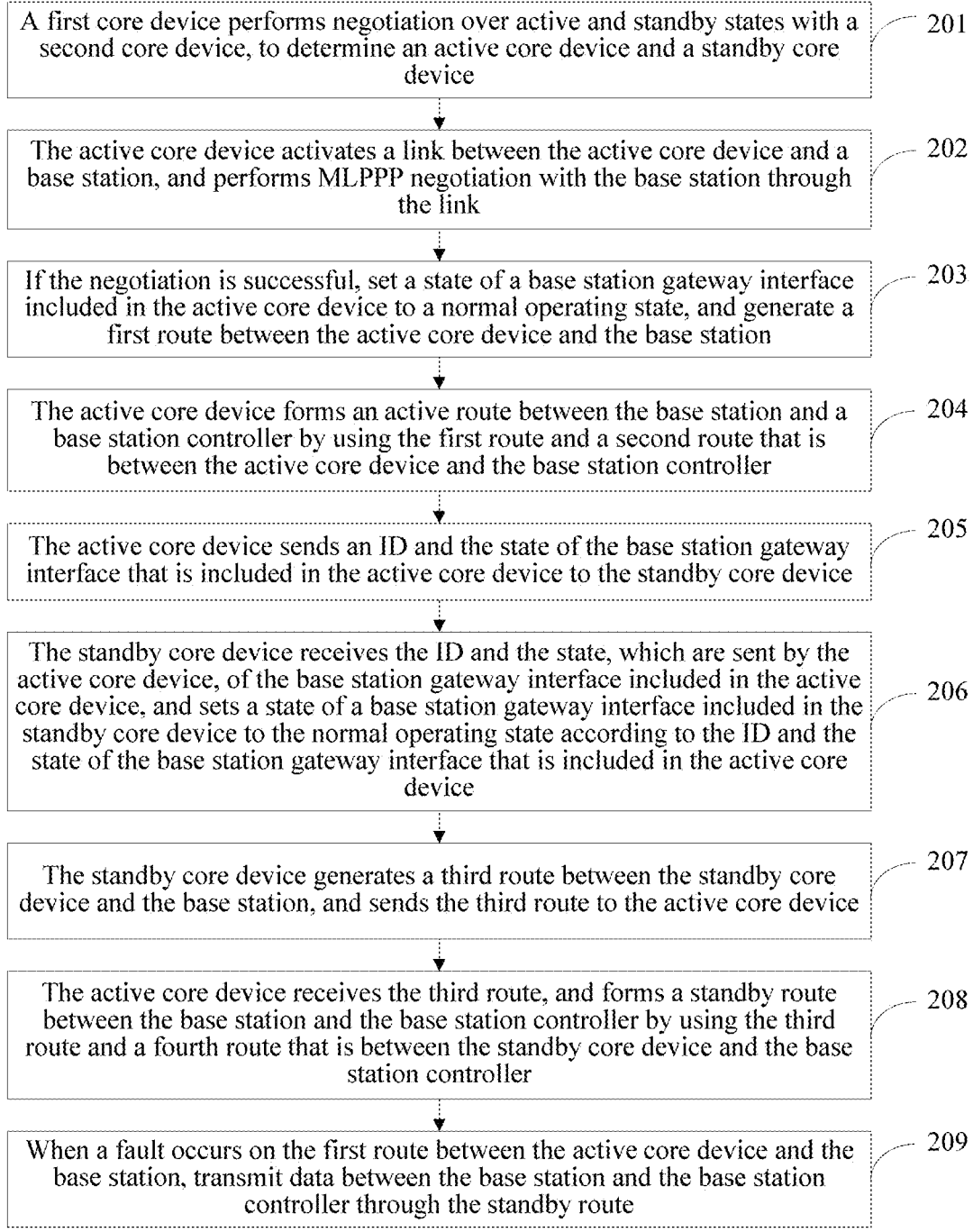
FIG. 3 is a flowchart of a method for transmitting data according to Embodiment 2 of the present application.

The embodiment of the present application provides a method for transmitting data. A system architecture shown in FIG. 2 includes a base station, a base station controller, a first core device, and a second core device, where for the first core device and the second core device, one is an active core device, and the other is a standby core device, and in the embodiment of the present application, a first network element is the base station, a second network element is the base station controller, a first gateway interface that is connected to the first network element and is included in the active core device is a base station gateway interface included in the active core device, and a second gateway interface that is connected to the first network element and is included in the standby core device is a base station gateway interface included in the standby core device. Referring to FIG. 3, the method includes the following.

S201: A first core device performs negotiation over active and standby states with a second core device, to determine an active core device and a standby core device.

In the embodiment of the present application, each of the first core device and the second core device may be a router, when the base station sends data to the base station controller, the base station may send the data to the base station controller by using the first core device and/or the second core device, and when the base station controller sends data to the base station, the base station controller may also send the data to the base station by using the first core device and/or the second core device.

The first core device and the second core device each set one gateway interface for the base station, and configure a same Internet Protocol (IP) address for the base station gateway interface included in the first core device and the base station gateway interface included in the second core device, and the first core device and the second core device each set one gateway interface for the base station controller.

Specifically, the first core device sends a first negotiation packet to the second core device, where the first negotiation packet carries a priority of the first core device, a state of the base station gateway interface included in the first core device, and a state of the base station controller gateway interface included in the first core device, and the second core device receives the first negotiation packet, if the state of the base station gateway interface included in the first core device and the state of the base station controller gateway interface included in the first core device are normal states, the priority of the first core device is compared with a priority of the second core device, and if the priority of the first core device is higher than the priority of the second core device, the second core device sets the first core device to the active core device, and sets the second core device to the standby core device. Accordingly, the second core device sends a second negotiation packet to the first core device, where the second negotiation packet carries the priority of the second core device, a state of the base station gateway interface included in the second core device, and a state of the base station controller gateway interface included in the second core device, and the first core device receives the second negotiation packet, if the state of the base station gateway interface included in the second core device and the state of the base station controller gateway interface included in the second core device are normal states, the priority of the second core device is compared with the priority of the first core device, and if the priority of the second core device is lower than the priority of the first core device, the first core device sets the first core device to the active core device, and sets the second core device to the standby core device.

Further, if the priority of the first core device is lower than the priority of the second core device, the second core device is set to the active core device, and the first core device is set to the standby core device.

Further, if the state of the base station gateway interface included in the first core device is a faulty state, or the state of the base station controller gateway interface is a faulty state, the second core device is set to the active core device. Accordingly, if the state of the base station gateway interface included in the second core device is a faulty state, or the state of the base station controller gateway interface is a faulty state, the first core device is set to the active core device.

The first core device and the second core device periodically send negotiation packets to each other, to perform negotiation over the active and standby states.

If the first core device does not receive, within a preset time, the second negotiation packet sent by the second core device, it is determined that the second core device is faulty, the first core device is set to the active core device, and the second core device is set to the standby core device, and if the second core device does not receive, within the preset time, the first negotiation packet sent by the first core device, it is determined that the first core device is faulty, the second core device is set to the active core device, and the first core device is set to the standby core device.

S202: The active core device activates a link between the active core device and a base station, and performs MLPPP negotiation with the base station through the link.

Specifically, the active core device sends a Point to Point Protocol (PPP) negotiation packet to the base station through the link, and the base station receives the PPP negotiation packet. If the base station determines to establish an MLPPP link to the active core device, the base station sends an acknowledgement packet to the active core device, and when the active core device receives the acknowledgement packet, it is determined that the active core device negotiates with the base station successfully.

Further, if the base station does not agree to establish the MLPPP link to the active core device, the base station sends a rejection packet to the active core device, and the active core device negotiates with the base station unsuccessfully.

S203: If the negotiation is successful, set a state of a base station gateway interface included in the active core device to a normal operating state, and generate a first route between the active core device and the base station.

Specifically, if the negotiation is successful, the state of the corresponding base station gateway interface is set to the normal operating state according to an identity (ID) of the base station gateway interface included in the active core device, an MLPPP link between the base station gateway interface included in the active core device and the base station is established, and the MLPPP link is determined as the first route between the active core device and the base station.

In this case, the normal operating state set for the base station gateway interface included in the active core device is obtained through negotiation, and may also be referred to as a negotiation normal operating state.

Further, the state of the base station controller gateway interface in the active core device is set to an active state, the state of the base station controller gateway interface in the standby core device is set to a standby state, and a second route between the base station controller and the active core device is generated. When sending data to the base station, the base station controller first sends the data to the active core device through the second route, and then the active core device sends the data to the base station. When the active core device is faulty, a standby second route between the base station controller and the standby core device is generated, and when sending data to the base station, the base station controller first sends the data to the standby core device through the second standby route, and then the standby core device sends the data to the base station.

S204: The active core device forms an active route between the base station and a base station controller by using the first route and a second route that is between the active core device and the base station controller.

Further, the active route is stored in the active core device.

S205: The active core device sends an ID and the state of the base station gateway interface that is included in the active core device to the standby core device.

The state of the base station gateway interface included in the active core device is the normal operating state.

S206: The standby core device receives the ID and the state, which are sent by the active core device, of the base station gateway interface included in the active core device, and sets a state of a base station gateway interface included in the standby core device to the normal operating state according to the ID and the state of the base station gateway interface that is included in the active core device.

Specifically, the standby core device receives the ID and the state, which are sent by the active core device, of the base station gateway interface included in the active core device, and acquires the base station gateway interface included in the standby core device according to the ID of the base station gateway interface included in the active core device. The received state of the base station gateway interface included in the active core device is the normal operating state, and therefore, a state of the acquired base station gateway interface included in the standby core device is set to the normal operating state.

In this case, the state set for the base station gateway interface included in the standby core device is set according to the state of the base station gateway interface included in the active core device, that is, the normal operating state of the base station gateway interface included in the standby core device may be a standby normal operating state.

Further, if an alarm exists in the active core device, the active core device sends alarm information to the standby core device while sending the ID and the state of the base station gateway interface that is included in the active core device. After receiving the ID and the state of the base station gateway interface that is included in the active core device and the alarm information, the standby core device sets the state of the base station gateway interface included in the standby core device to a non-operating state according to the ID of the base station gateway interface included in the active core device.

Optionally, if a user manually sets the state of the base station gateway interface included in the active core device to a non-operating state, the active core device sends the ID and the state of the base station gateway interface that is included in the active core device to the standby core device, so that the standby core device sets the state of the base station gateway interface included in the standby core device to a non-operating state according to the received ID and the state of the base station gateway interface.

Further, after performing normal MLPPP negotiation with the base station, the standby core device sets a priority of the state of the base station gateway interface included in the standby core device to the highest. That is, a priority, of the state of the base station gateway interface, set by the standby core device after performing MLPPP negotiation with the base station is higher than a priority, of the state of the base station gateway interface, set by the standby core device according to the state of the base station gateway interface included in the active core device, that is, a priority of the negotiation normal operating state is higher than a priority of the standby normal operating state.

S207: The standby core device generates a third route between the standby core device and the base station, and sends the third route to the active core device.

Specifically, the standby core device establishes an MLPPP link between the base station gateway interface included in the standby core device and the base station, determines the link as the third route between the standby core device and the base station, and sends the third route to the active core device.

S208: The active core device receives the third route, and forms a standby route between the base station and the base station controller by using the third route and a fourth route that is between the standby core device and the base station controller.

Specifically, the active core device receives the third route, forms the fourth route between the standby core device and the base station controller by using a fifth route between the standby core device and the active core device and the second route between the active core device and the base station controller, and forms the standby route between the base station and the base station controller by using the third route and the fourth route that is between the standby core device and the base station controller.

When the active core device receives the third route, the active core device forms the standby route by using the third route and the fourth route that is between the standby core device and the base station controller, and stores the standby route in the active core device. In this case, two routes between the base station and the base station controller, that is, the active route and the standby route are stored in the active core device.

When the active route and the standby route are both normal, data is transmitted between the base station and the base station controller through the active route stored in the active core device.

The two routes, that is, the active route and the standby route, are stored in the active core device. When a fault occurs on the active route, traffic can be fast switched to the standby route, so that a speed of network convergence is increased.

S209: When a fault occurs on the first route between the active core device and the base station, transmit data between the base station and the base station controller through the standby route.

Specifically, when a fault occurs on the link between the active core device and the base station, that is, the fault occurs on the first route between the active core device and the base station, a route that is for transmitting data and between the base station and the base station controller is switched to the standby route, and the data between the base station and the base station controller is transmitted through the standby route.

When the fault occurs on the link between the active core device and the base station, active and standby states of the active core device and the standby core device do not change, and in this case, data sent by the base station controller to the base station is first sent to the active core device.

In the embodiment of the present application, an active route and a standby route between a base station and a base station controller are stored in an active core device, and if a fault occurs on a first route between the active core device and the base station, a standby core device does not need to perform MLPPP negotiation with the base station, instead, it is only required that the active core device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station, loss of the data transmitted between the base station controller and the base station can be reduced.

Embodiment 3

Figure 4:
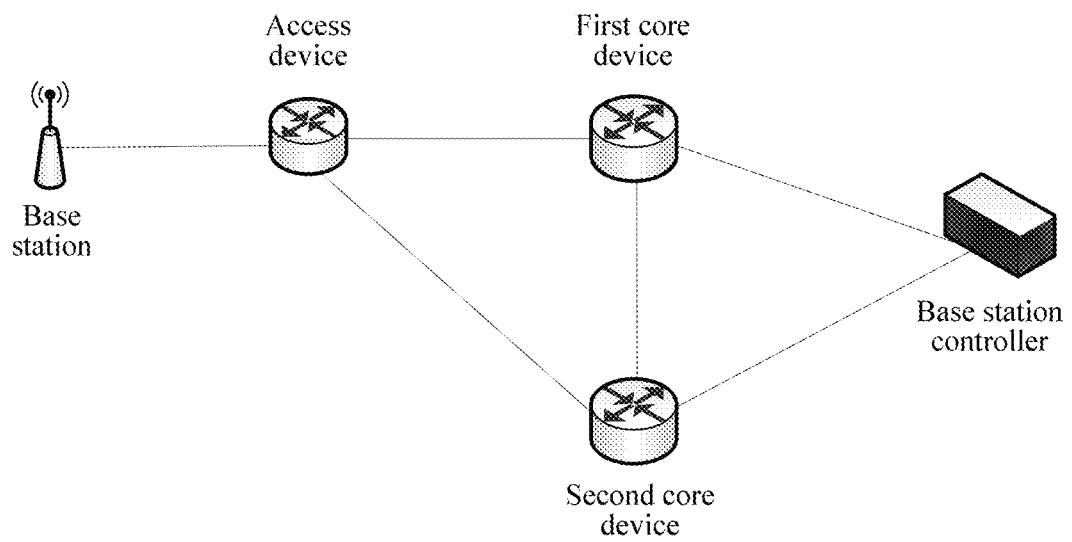
FIG. 4 is an architectural diagram of a system for transmitting data according to Embodiment 3 of the present application.
Figure 5:
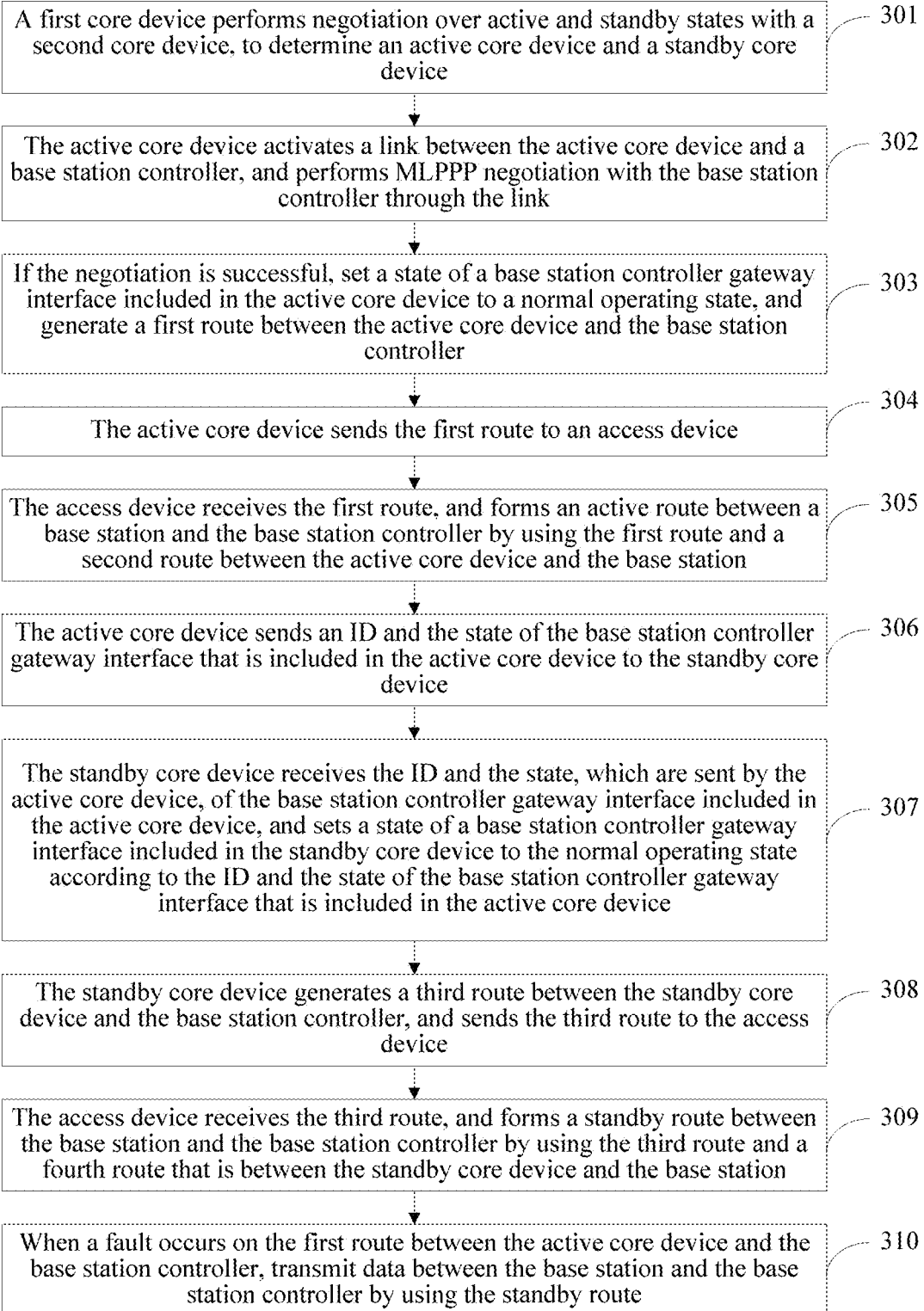
FIG. 5 is a flowchart of a method for transmitting data according to Embodiment 3 of the present application.

The embodiment of the present application provides a method for transmitting data. A system architecture shown in FIG. 4 includes a base station, a base station controller, an access device, a first core device, and a second core device, where for the first core device and the second core device, one is an active core device, and the other is a standby core device, and in the embodiment of the present application, a first network element is the base station controller, a second network element is the base station, a first gateway interface that is connected to the first network element and is included in the active core device is a base station controller gateway interface included in the active core device, and a second gateway interface that is connected to the first network element and is included in the standby core device is a base station controller gateway interface included in the standby core device. Referring to FIG. 5, the method includes the following.

S301: A first core device performs negotiation over active and standby states with a second core device, to determine an active core device and a standby core device.

In the embodiment of the present application, each of the first core device and the second core device may be a router, when the base station sends data to the base station controller, the base station may send the data to the base station controller by using the first core device and/or the second core device, and when the base station controller sends data to the base station, the base station controller may also send the data to the base station by using the first core device and/or the second core device.

The first core device and the second core device each set one gateway interface for the base station, and configure a same Internet Protocol (IP) address for the base station controller gateway interface included in the first core device and the base station controller gateway interface included in the second core device, and the first core device and the second core device each set one gateway interface for the base station controller.

Specifically, the first core device sends a first negotiation packet to the second core device, where the first negotiation packet carries a priority of the first core device, a state of the base station gateway interface included in the first core device, and a state of the base station controller gateway interface included in the first core device, and the second core device receives the first negotiation packet, if the state of the base station gateway interface included in the first core device and the state of the base station controller gateway interface included in the first core device are normal states, the priority of the first core device is compared with a priority of the second core device, and if the priority of the first core device is higher than the priority of the second core device, the second core device sets the first core device to the active core device, and sets the second core device to the standby core device. Accordingly, the second core device sends a second negotiation packet to the first core device, where the second negotiation packet carries the priority of the second core device, a state of the base station gateway interface included in the second core device, and a state of the base station controller gateway interface included in the second core device, and the first core device receives the second negotiation packet, if the state of the base station gateway interface included in the second core device and the state of the base station controller gateway interface included in the second core device are normal states, the priority of the second core device is compared with the priority of the first core device, and if the priority of the second core device is lower than the priority of the first core device, the first core device sets the first core device to the active core device, and sets the second core device to the standby core device.

Further, if the priority of the first core device is lower than the priority of the second core device, the second core device is set to the active core device, and the first core device is set to the standby core device.

The first core device and the second core device periodically send negotiation packets to each other, to perform negotiation over the active and standby states.

If the first core device does not receive, within a preset time, the second negotiation packet sent by the second core device, it is determined that the second core device is faulty, the first core device is set to the active core device, and the second core device is set to the standby core device, and if the second core device does not receive, within the preset time, the first negotiation packet sent by the first core device, it is determined that the first core device is faulty, the second core device is set to the active core device, and the first core device is set to the standby core device.

S302: The active core device activates a link between the active core device and a base station controller, and performs MLPPP negotiation with the base station controller through the link.

Specifically, the active core device sends a Point to Point Protocol (PPP) negotiation packet to the base station controller through the link, and the base station controller receives the PPP negotiation packet, if the base station controller determines to establish an MLPPP link to the active core device, the base station controller sends an acknowledgement packet to the active core device, and when the active core device receives the acknowledgement packet, it is determined that the active core device negotiates with the base station controller successfully.

Further, if the base station controller does not agree to establish the MLPPP link to the active core device, the base station controller sends a rejection packet to the active core device, and the active core device negotiates with the base station controller unsuccessfully.

S303: If the negotiation is successful, set a state of a base station controller gateway interface included in the active core device to a normal operating state, and generate a first route between the active core device and the base station controller.

Specifically, if the negotiation is successful, the state of the corresponding base station controller gateway interface is set to the normal operating state according to an identity (ID) of the base station controller gateway interface included in the active core device, an MLPPP link between the base station controller gateway interface included in the active core device and the base station controller is established, and the MLPPP link is determined as the first route between the active core device and the base station controller.

In this case, the normal operating state set for the base station controller gateway interface included in the active core device is obtained through negotiation, and may also be referred to as a negotiation normal operating state.

S304: The active core device sends the first route to an access device.

The access device is a transmission device at an access layer on a transmission network.

S305: The access device receives the first route, and forms an active route between a base station and the base station controller by using the first route and a second route that is between the active core device and the base station.

Specifically, the access device receives the first route, forms the second route between the active core device and the base station by using a sixth route between the active core device and the access device and a seventh route between the access device and the base station, and forms the active route between the base station and the base station controller by using the first route and the second route between the active core device and the base station.

Further, the active route is stored in the access device.

S306: The active core device sends an ID and the state of the base station controller gateway interface that is included in the active core device to the standby core device.

The state of the base station controller gateway interface included in the active core device is the normal operating state.

S307: The standby core device receives the ID and the state, which are sent by the active core device, of the base station controller gateway interface included in the active core device, and sets a state of a base station controller gateway interface included in the standby core device to the normal operating state according to the ID of the base station controller gateway interface that is included in the active core device.

Specifically, the standby core device receives the ID and the state, which are sent by the active core device, of the base station controller gateway interface included in the active core device, and acquires the base station controller gateway interface included in the standby core device according to the ID of the base station controller gateway interface included in the active core device. The received state of the base station controller gateway interface included in the active core device is the normal operating state, and therefore, a state of the acquired base station controller gateway interface included in the standby core device is set to the normal operating state.

In this case, the state set for the base station controller gateway interface included in the standby core device is set according to the state of the base station controller gateway interface included in the active core device, that is, the normal operating state of the base station controller gateway interface included in the standby core device may be a standby normal operating state.

Further, if an alarm exists in the active core device, the active core device sends alarm information to the standby core device while sending the ID and the state of the base station controller gateway interface that is included in the active core device. After receiving the ID and the state of the base station controller gateway interface that is included in the active core device and the alarm information, the standby core device sets the state of the base station controller gateway interface included in the standby core device to a non-operating state according to the ID of the base station controller gateway interface included in the active core device.

Optionally, if a user manually sets the state of the base station controller gateway interface included in the active core device to a non-operating state, the active core device sends the ID and the state of the base station controller gateway interface that is included in the active core device to the standby core device, so that the standby core device sets the state of the base station controller gateway interface included in the standby core device to a non-operating state according to the received ID and the state of the base station controller gateway interface.

Further, after performing normal MLPPP negotiation with the base station controller, the standby core device sets a priority of the state of the base station controller gateway interface included in the standby core device to the highest. That is, a priority, of the state of the base station controller gateway interface, set by the standby core device after performing MLPPP negotiation with the base station controller is higher than a priority, of the state of the base station controller gateway interface, set by the standby core device according to the state of the base station controller gateway interface included in the active core device, that is, a priority of the negotiation normal operating state is higher than a priority of the standby normal operating state.

S308: The standby core device generates a third route between the standby core device and the base station controller, and sends the third route to the access device.

Specifically, the standby core device establishes an MLPPP link between the base station controller gateway interface included in the standby core device and the base station controller, determines the link as the third route between the standby core device and the base station controller, and sends the third route to the access device.

S309: The access device receives the third route, and forms a standby route between the base station and the base station controller by using the third route and a fourth route that is between the standby core device and the base station.

Specifically, the access device receives the third route, forms the fourth route between the standby core device and the base station by using an eighth route between the standby core device and the access device and the seventh route between the access device and the base station, and forms the standby route between the base station and the base station controller by using the third route and the fourth route that is between the standby core device and the base station.

When the active core device receives the third route, the active core device forms the standby route by using the third route and the fourth route that is between the standby core device and the base station, and stores the standby route in the access device. In this case, two routes between the base station and the base station controller, that is, the active route and the standby route are stored in the access device.

When the active route and the standby route are both normal, data is transmitted between the base station and the base station controller through the active route stored in the access device.

The two routes, that is, the active route and the standby route, are stored in the access device. When a fault occurs on the active route, traffic can be fast switched to the standby route, so that a speed of network convergence is increased.

The active core device may first send the first route to the access device, and then send the ID and the state of the base station controller gateway interface that is included in the active core device to the standby core device, or may first send the ID and the state of the base station controller gateway interface that is included in the active core device to the standby core device, and then send the first route to the access device. Certainly, the ID, the state, and the first route may also be sent at the same time. In the embodiment of the present application, a sequence of sending the first route, the ID and the state of the base station controller gateway interface that is included in the active core device is not limited.

S310: When a fault occurs on the first route between the active core device and the base station controller, transmit data between the base station and the base station controller through the standby route.

Specifically, when a fault occurs on the link between the active core device and the base station controller, that is, the fault occurs on the first route between the active core device and the base station controller, a route that is for transmitting data and between the base station and the base station controller is switched to the standby route, and the data between the base station and the base station controller is transmitted through the standby route.

In the embodiment of the present application, an active route and a standby route between a base station and a base station controller are stored in an access device, and if a fault occurs on a first route between an active core device and the base station controller, a standby core device does not need to perform MLPPP negotiation with the base station controller, instead, it is only required that the access device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station controller, loss of the data transmitted between the base station controller and the base station can be reduced.

Embodiment 4

The embodiment of the present application provides a method for transmitting data.

Figure 6:
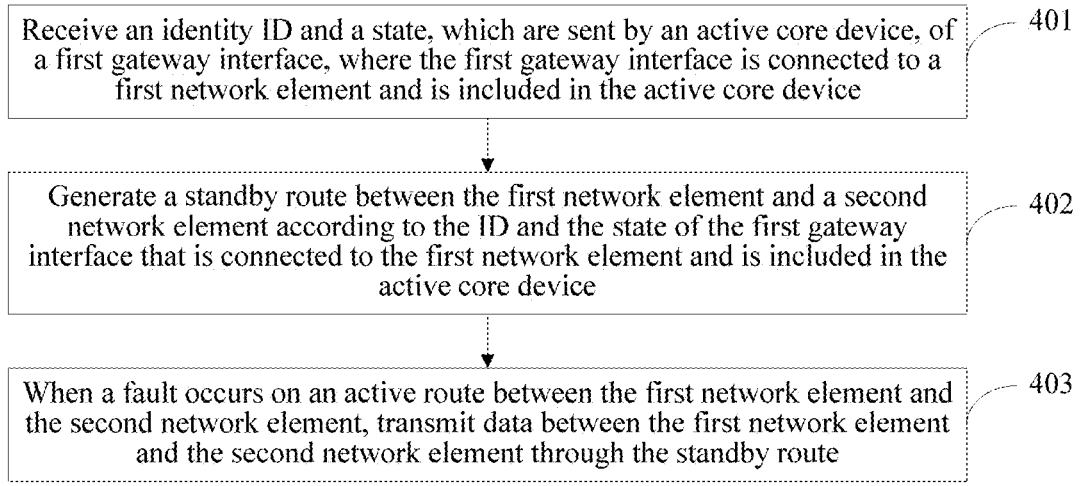
FIG. 6 is a flowchart of a method for transmitting data according to Embodiment 4 of the present application.

Referring to FIG. 6, the method includes the following.

S401: Receive an identity ID and a state, which are sent by an active core device, of a first gateway interface, where the first gateway interface is connected to a first network element and is included in the active core device.

S402: Generate a standby route between the first network element and a second network element according to the ID and the state of the first gateway interface that is connected to the first network element and is included in the active core device.

S403: When a fault occurs on an active route between the first network element and the second network element, transmit data between the first network element and the second network element through the standby route.

The embodiment of the present application may be executed by a standby core device.

In the embodiment of the present application, an active route and a standby route between a base station and a base station controller are stored in an access device, and if a fault occurs on a first route between an active core device and the base station controller, a standby core device does not need to perform MLPPP negotiation with the base station controller, instead, it is only required that the access device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station controller, loss of the data transmitted between the base station controller and the base station can be reduced.

Embodiment 5

Figure 7:
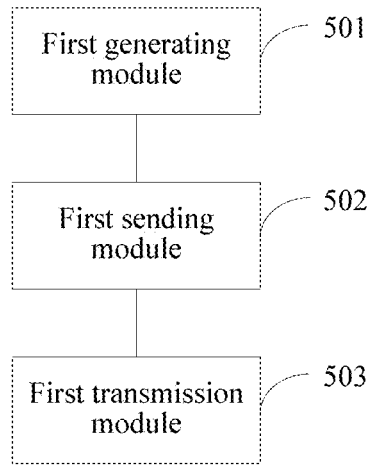
FIG. 7 is a schematic structural diagram of a device for transmitting data according to Embodiment 5 of the present application.

Referring to FIG. 7, the embodiment of the present application provides a device for transmitting data, where the device includes a first generating module 501, configured to generate an active route between a first network element and a second network element, where the active route includes a first route between an active core device and the first network element and a second route between the active core device and the second network element, and transmit data between the first network element and the second network element through the active route, a first sending module 502, configured to send an identity ID and a state of a first gateway interface that is connected to the first network element and is included in the active core device to a standby core device, so that the standby core device generates a standby route between the first network element and the second network element, where the standby route includes a third route between the standby core device and the first network element and a fourth route between the standby core device and the second network element, and a first transmission module 503, configured to when a fault occurs on the first route, transmit the data between the first network element and the second network element through the standby route.

The first generating module 501 includes a first negotiation unit, configured to activate a link between the active core device and the first network element, and perform Multilink Point to Point Protocol MLPPP negotiation with the first network element through the link, a first generating unit, configured to if the negotiation is successful, set a state of the first gateway interface that is connected to the first network element and is included in the active core device to a normal operating state, and generate the first route between the active core device and the first network element, and a first forming unit, configured to form the active route between the first network element and the second network element by using the first route and the second route that is between the active core device and the second network element.

Further, the device further includes a first receiving module, configured to receive the third route, sent by the standby core device, between the standby core device and the first network element, a first forming module, configured to form the fourth route between the standby core device and the second network element by using a fifth route between the active core device and the standby core device and the second route between the active core device and the second network element, and a second forming module, configured to form the standby route between the first network element and the second network element by using the third route and the fourth route.

Optionally, the first generating module 501 includes a second negotiation unit, configured to activate a link between the active core device and the first network element, and perform MLPPP negotiation with the first network element through the link, a second generating unit, configured to if the negotiation is successful, set a state of the first gateway interface that is connected to the first network element and is included in the active core device to a normal operating state, and generate the first route between the active core device and the first network element, and a second forming unit, configured to send the first route to an access device, so that the access device forms the active route between the first network element and the second network element by using the first route and the second route that is between the active core device and the second network element.

Further, the device further includes a second sending module, configured to if an alarm exists in the active core device, send the ID and the state of the first gateway interface that is connected to the first network element and that is included in the active core device and alarm information of the active core device to the standby core device, so that the standby core device sets a state of a second gateway interface that is connected to the first network element and is included in the standby core to a non-operating state.

Further, the device further includes a third sending module, configured to if a user manually sets the state of the first gateway interface that is connected to the first network element and is included in the active core device to a non-operating state, send the ID and the state of the first gateway interface that is connected to the first network element and is included in the active core device to the standby core device, so that the standby core device sets a state of a second gateway interface that is connected to the first network element and is included in the standby core device to a non-operating state.

In the embodiment of the present application, an active route and a standby route between a base station and a base station controller are stored in an active core device, and if a fault occurs on a first route between the active core device and the base station, a standby core device does not need to perform MLPPP negotiation with the base station, instead, it is only required that the active core device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station, loss of the data transmitted between the base station controller and the base station can be reduced.

Embodiment 6

Figure 8:
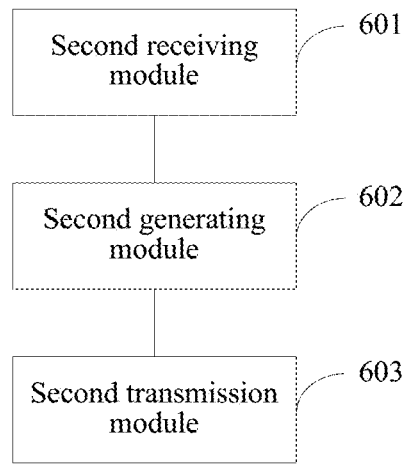
FIG. 8 is a schematic structural diagram of a device for transmitting data according to Embodiment 6 of the present application.

The embodiment of the present application provides a device for transmitting data. Referring to FIG. 8, the device includes a second receiving module 601, configured to receive an identity ID and a state, which are sent by an active core device, of a first gateway interface, where the first gateway interface is connected to a first network element and is included in the active core device, a second generating module 602, configured to generate a standby route between the first network element and a second network element according to the ID and the state of the first gateway interface that is connected to the first network element and is included in the active core device, and a second transmission module 603, configured to when a fault occurs on an active route between the first network element and the second network element, transmit data between the first network element and the second network element through the standby route.

The second generating module 602 includes a first setting unit, configured to set a state of a second gateway interface that is connected to the first network element and is included in a standby core device to a normal operating state according to the ID and the state of the first gateway interface that is connected to the first network element and is included in the active core device, and a first sending unit, configured to generate a third route between the standby core device and the first network element, and send the third route to the active core device, so that the active core device forms the standby route between the first network element and the second network element by using the third route and a fourth route that is between the standby core device and the second network element.

Optionally, the second generating module 602 includes a second setting unit, configured to set a state of a second gateway interface that is connected to the first network element and is included in a standby core device to a normal operating state according to the ID and the state of the first gateway interface that is connected to the first network element and is included in the active core device, and a second sending unit, configured to generate a third route between the standby core device and the first network element, and send the third route to an access device, so that the access device forms the standby route between the first network element and the second network element by using the third route and a fourth route that is between the standby core device and the second network element.

Further, the device further includes a third receiving module, configured to receive the ID and the state of the first gateway interface and alarm information of the active core device that are sent by the active core device, where the first gateway interface is connected to the first network element and is included in the active core device, and a first setting module, configured to set the state of the second gateway interface that is connected to the first network element and is included in the standby core device to a non-operating state according to the ID and the state of the first gateway interface that is connected to the first network element and is included in the active core device.

Further, the device further includes a fourth receiving module, configured to if a user manually sets the state of the first gateway interface that is connected to the first network element and is included in the active core device to a non-operating state, receive the ID and the state, which are sent by the active core device, of the first gateway interface, where the first gateway interface is connected to the first network element and is included in the active core device, and a second setting module, configured to set the state of the second gateway interface that is connected to the first network element and is included in the standby core device to a non-operating state according to the ID and the state of the first gateway interface that is connected to the first network element and is included in the active core device.

In the embodiment of the present application, an active route and a standby route between a base station and a base station controller are stored in an access device, and if a fault occurs on a first route between an active core device and the base station controller, a standby core device does not need to perform MLPPP negotiation with the base station controller, instead, it is only required that the access device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station controller, loss of the data transmitted between the base station controller and the base station can be reduced.

Embodiment 7

Figure 9:
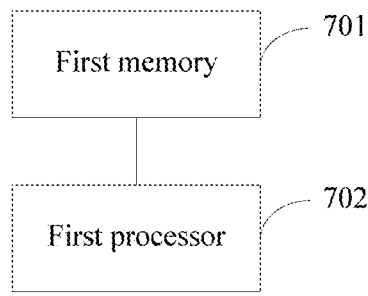
FIG. 9 is a schematic structural diagram of a device for transmitting data according to Embodiment 7 of the present application.

The embodiment of the present application provides a device for transmitting data. Referring to FIG. 9, the device includes a first memory 701 and a first processor 702, configured to execute a method for transmitting data described in the following, where the method includes generating an active route between a first network element and a second network element, where the active route includes a first route between an active core device and the first network element and a second route between the active core device and the second network element, and transmitting data between the first network element and the second network element through the active route, sending an identity ID and a state of a first gateway interface that is connected to the first network element and is included in the active core device to a standby core device, so that the standby core device generates a standby route between the first network element and the second network element, where the standby route includes a third route between the standby core device and the first network element and a fourth route between the standby core device and the second network element, and when a fault occurs on the first route, transmitting the data between the first network element and the second network element through the standby route.

The generating an active route between a first network element and a second network element includes activating a link between the active core device and the first network element, and performing Multilink Point to Point Protocol MLPPP negotiation with the first network element through the link, if the negotiation is successful, setting a state of the first gateway interface that is connected to the first network element and is included in the active core device to a normal operating state, and generating the first route between the active core device and the first network element, and forming the active route between the first network element and the second network element by using the first route and the second route that is between the active core device and the second network element.

Further, after the sending an identity ID and a state of a first gateway interface that is connected to the first network element and is included in the active core device to a standby core device, the method further includes receiving the third route, sent by the standby core device, between the standby core device and the first network element, forming the fourth route between the standby core device and the second network element by using a fifth route between the active core device and the standby core device and the second route between the active core device and the second network element, and forming the standby route between the first network element and the second network element by using the third route and the fourth route.

Optionally, the generating an active route between a first network element and a second network element includes activating a link between the active core device and the first network element, and performing MLPPP negotiation with the first network element through the link, if the negotiation is successful, setting a state of the first gateway interface that is connected to the first network element and is included in the active core device to a normal operating state, and generating the first route between the active core device and the first network element, and sending the first route to an access device, so that the access device forms the active route between the first network element and the second network element by using the first route and the second route that is between the active core device and the second network element.

Further, the method further includes if an alarm exists in the active core device, sending the ID and the state of the first gateway interface that is connected to the first network element and that is included in the active core device and alarm information of the active core device to the standby core device, so that the standby core device sets a state of a second gateway interface that is connected to the first network element and is included in the standby core to a non-operating state.

Further, the method further includes if a user manually sets the state of the first gateway interface that is connected to the first network element and is included in the active core device to a non-operating state, sending the ID and the state of the first gateway interface that is connected to the first network element and is included in the active core device to the standby core device, so that the standby core device sets a state of a second gateway interface that is connected to the first network element and is included in the standby core device to a non-operating state.

In the embodiment of the present application, an active route and a standby route between a base station and a base station controller are stored in an active core device, and if a fault occurs on a first route between the active core device and the base station, a standby core device does not need to perform MLPPP negotiation with the base station, instead, it is only required that the active core device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station, loss of the data transmitted between the base station controller and the base station can be reduced.

Embodiment 8

Figure 10:
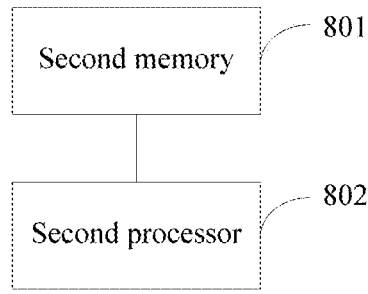
FIG. 10 is a schematic structural diagram of a device for transmitting data according to Embodiment 8 of the present application.

The embodiment of the present application provides a device for transmitting data. Referring to FIG. 10, the device includes a second memory 801 and a second processor 802, configured to execute a method for transmitting data described in the following, where the method includes receiving an identity ID and a state, which are sent by an active core device, of a first gateway interface, where the first gateway interface is connected to a first network element and is included in the active core device, generating a standby route between the first network element and a second network element according to the ID and the state of the first gateway interface that is connected to the first network element and is included in the active core device, and when a fault occurs on an active route between the first network element and the second network element, transmitting data between the first network element and the second network element through the standby route.

The generating a standby route between the first network element and a second network element according to the ID and the state of the first gateway interface that is connected to the first network element and is included in the active core device includes setting a state of a second gateway interface that is connected to the first network element and is included in a standby core device to a normal operating state according to the ID and the state of the first gateway interface that is connected to the first network element and is included in the active core device, and generating a third route between the standby core device and the first network element, and sending the third route to the active core device, so that the active core device forms the standby route between the first network element and the second network element by using the third route and a fourth route that is between the standby core device and the second network element.

Optionally, the generating a standby route between the first network element and a second network element according to the ID and the state of the first gateway interface that is connected to the first network element and is included in the active core device includes setting a state of a second gateway interface that is connected to the first network element and is included in a standby core device to a normal operating state according to the ID and the state of the first gateway interface that is connected to the first network element and is included in the active core device, and generating a third route between the standby core device and the first network element, and sending the third route to an access device, so that the access device forms the standby route between the first network element and the second network element by using the third route and a fourth route that is between the standby core device and the second network element.

Further, the method further includes receiving the ID and the state of the first gateway interface and alarm information of the active core device that are sent by the active core device, where the first gateway interface is connected to the first network element and is included in the active core device, and setting the state of the second gateway interface that is connected to the first network element and is included in the standby core device to a non-operating state according to the ID and the state of the first gateway interface that is connected to the first network element and is included in the active core device.

Further, the method further includes if a user manually sets the state of the first gateway interface that is connected to the first network element and is included in the active core device to a non-operating state, receiving the ID and the state, which are sent by the active core device, of the first gateway interface, where the first gateway interface is connected to the first network element and is included in the active core device, and setting the state of the second gateway interface that is connected to the first network element and is included in the standby core device to a non-operating state according to the ID and the state of the first gateway interface that is connected to the first network element and is included in the active core device.

In the embodiment of the present application, an active route and a standby route between a base station and a base station controller are stored in an access device, and if a fault occurs on a first route between an active core device and the base station controller, a standby core device does not need to perform MLPPP negotiation with the base station controller, instead, it is only required that the access device switch a route, for transmitting data, between the base station and the base station controller to the standby route, to implement data communication between the base station and the base station controller through the standby route. A quite short time is required to switch the route, for transmitting data, between the base station and the base station controller to the standby route, and therefore, when a fault occurs on a link between the active core device and the base station controller, loss of the data transmitted between the base station controller and the base station can be reduced.

It should be noted that, division of the foregoing functional modules is used only as an example for description during data transmission performed by the device for transmitting data that is provided in the foregoing embodiments. In actual application, the functions may be allocated to different functional modules for implementation as required, which means that an internal structure of the apparatus is divided into different functional modules to implement all or some of the functions described above. In addition, the device for transmitting data provided in the foregoing embodiments is based on the same concept as the method for transmitting data in the foregoing embodiments. For a specific implementation process, refer to the method embodiments, and the details are not described herein again.

The sequence numbers of the foregoing embodiments of the present application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present application, but are not intended to limit the present application. Any modification, equivalent replacement, and improvement made without departing from the spirit and principle of the present application shall fall within the protection scope of the present application.

What is claimed is:

1. A method, comprising:
    transmitting traffic between a first network element (NE) and a second NE through an active route, wherein the active route comprises a first route between an active core device and the first NE and a second route between the active core device and the second NE, wherein the active core device stores the active route and a standby route; and
    transmitting, in response to a fault occurring on the first route, the traffic between the first NE and the second NE through the standby route without a negotiation between a standby core device and the first NE being performed in response to the fault occurring on the first route;
    wherein the standby core device stores an identity (ID) and a state of a first gateway interface, wherein the first gateway interface is communicably coupled to the first NE, and is disposed in the active core device; and
    wherein the standby route is generated according to the ID and the state of the first gateway interface and comprises a third route between the first NE and the standby core device and a fourth route between the standby core device and the second NE.

2. The method according to claim 1, wherein the method further comprises generating the active route between the first NE and the second NE, wherein the generating the active route between the first NE and the second NE comprises:
    activating a link between the active core device and the first NE;
    performing Multilink Point to Point Protocol (MLPPP) negotiation with the NE through the link;
    performing, in response to MLPPP negotiation being successful, setting a state of the first gateway interface to a normal operating state, and generating the first route; and
    forming the active route using the first route and the second route.

3. The method according to claim 1, further comprising:
    receiving from the standby core device, the third route;
    forming the fourth route by using a fifth route between the active core device and the standby core device and the second route; and
    forming the standby route between the first network element and the second network element by using the third route and the fourth route.

4. The method according to claim 1, wherein the method further comprises generating the active route, and wherein generating the active route comprises:
    activating a link between the active core device and the first NE;
    performing Multilink Point to Point Protocol (MLPPP) negotiation with the first NE through the link;
    performing, in response to the MLPPP negotiation being successful, setting the state of the first gateway interface to a normal operating state, and generating the first route; and
    sending the first route to an access device.

5. The method according to claim 1, further comprising:
sending, in response to an alarm existing in the active core device, the ID and state of the first gateway interface and alarm information of the active core device to the standby core device.

6. The method according to claim 1, further comprising:
sending, in response to a user having manually set the state of the first gateway interface to a non-operating state, the ID of the first gateway interface and the state of the first gateway interface to the standby core device.

7. The method according to claim 1, wherein one of the first NE and the second NE is a base station and an other one of the first NE and the second NE is a base station controller.

8. The method according to claim 1, wherein the first NE communicates with the active core device via an access device.

9. The method according to claim 1, wherein the active core device is a router.

10. The method according to claim 1, wherein the active core device comprises a first gateway controller interface and the standby core device comprises a second gateway controller interface, wherein the first gateway controller interface has an Internet Protocol (IP) address that is the same as an IP address of the second gateway controller interface.

11. The method according to claim 1, wherein the standby core device comprises a second gateway interface, wherein the first gateway interface has an Internet Protocol (IP) address that is the same as an IP address of the second gateway interface.

12. The method according to claim 1, wherein the active core device stores the active route and the standby route.

13. A method, comprising:
obtaining an identity (ID) and a state of a first gateway interface from an active core device, wherein the first gateway interface is communicably coupled to a first network element and is disposed in the active core device; and
generating a standby route between the first network element and a second network element according to the ID of the first gateway interface and the state of the first gateway interface, wherein the generating the standby route comprises:
setting a state of a second gateway interface that is connected to the first network element and is disposed in a standby core device to a normal operating state according to the ID of the first gateway interface and the state of the first gateway interface; and
generating a third route between the standby core device and the first network element, and sending the third route to an access device;
wherein the standby route is for data transmission between the first network element and the second network element in response to a fault occurring on an active route between the first network element and the second network element, wherein the active core device stores the active route and the standby route, and wherein a negotiation between a standby core device and the first NE is avoided in response to the fault occurring on the active route.

14. The method according to claim 13, wherein the generating the standby route comprises:
setting a state of a second gateway interface that is connected to the first network element and is disposed in a standby core device to a normal operating state according to the ID of the first gateway interface and the state of the first gateway interface; and
generating a third route between the standby core device and the first network element, and sending the third route to the active core device.

15. The method according to claim 13, further comprising:
receiving the ID of the first gateway interface, the state of the first gateway interface, and alarm information of the active core device from the active core device; and
setting the state of a second gateway interface to a non-operating state according to the ID of the first gateway interface and the state of the first gateway interface.

16. The method according to claim 13, further comprising:
receiving, in response to a user having manually set the state of the first gateway interface to a non-operating state, the ID of the first gateway interface and the state of the first gateway interface from the active core device; and
setting the state of a second gateway interface to a non-operating state according to the ID of the first gateway interface and the state of the first gateway interface.

17. A device, comprising:
a processor; and
a non-transitory computer-readable storage medium storing a program to be executed by the processor, the program including instructions for:
transmitting traffic between a first network element (NE) and a second NE through an active route, wherein the active route comprises a first route between an active core device and the first NE and a second route between the active core device and the second NE, wherein the active core device stores the active route and a standby route; and
transmitting, in response to a fault occurring on the first route, the traffic between the first NE and the second NE through the standby route without a negotiation between a standby core device and the first NE being performed in response to the fault occurring on the first route;
wherein the standby core device stores an identity (ID) and a state of a first gateway interface, wherein the first gateway interface is communicably coupled to the first NE, and is disposed in the active core device; and
wherein the standby route is generated according to the ID and the state of the first gateway interface and comprises a third route between the first NE and the standby core device and a fourth route between the standby core device and the second NE.

18. A device, comprising:
a processor; and
a non-transitory computer-readable storage medium storing a program to be executed by the processor, the program including instructions for:
obtaining an identity (ID) and a state of a first gateway interface from an active core device, wherein the first gateway interface is communicably coupled to a first network element and is disposed in the active core device; and
generating a standby route between the first network element and a second network element according to the ID of the first gateway interface and the state of the first gateway interface, wherein the instructions for generating the standby route include instructions for:

setting a state of a second gateway interface that is connected to the first network element and is disposed in a standby core device to a normal operating state according to the ID of the first gateway interface and the state of the first gateway interface; and
generating a third route between the standby core device and the first network element, and sending the third route to an access device;
wherein the standby route is for data transmission between the first network element and the second network element in response to a fault occurring on an active route between the first network element and the second network element, wherein the active core device stores the active route and the standby route, and wherein a negotiation between the standby core device and the first NE is avoided in response to the fault occurring on the active route.

19. A network system, comprising:
a first network element (NE); and
a second NE;
wherein the first NE is configured to:
   transmit traffic between the first NE and the second NE through an active route, wherein the active route comprises a first route between an active core device and the first NE and a second route between the active core device and the second NE, wherein the active core device stores the active route and a standby route; and
   transmit, in response to a fault occurring on the first route, the traffic between the first NE and the second NE through the standby route without a negotiation between a standby core device and the first NE being performed in response to the fault occurring on the first route;
wherein the standby route comprises a third route between the first NE and the standby core device and a fourth route between the standby core device and the second NE;
wherein the standby core device stores an identity (ID) and a state of a first gateway interface, wherein the first gateway interface is communicably coupled to the first NE, and is disposed in the active core device; and
wherein the standby route is generated according to the ID and the state of the first gateway interface.

* * * * *